United States Patent [19]

Malm

[11] 3,946,631
[45] Mar. 30, 1976

[54] UNDERCUT SAW

[76] Inventor: John A. Malm, 19731 Frazier Drive, Rocky River, Ohio 44116

[22] Filed: Mar. 4, 1974

[21] Appl. No.: 447,726

[52] U.S. Cl. .............. 83/380; 83/390; 83/397; 83/477.1; 83/471.3; 83/488; 83/DIG. 1
[51] Int. Cl.² ........................................ B26D 5/04
[58] Field of Search ............ 83/397, 390, 453, 461, 83/544, 477.1, 471.3, 488, 468, 380, 484, 581, DIG. 1, 487; 192/131 R

[56] References Cited
UNITED STATES PATENTS

| | | | |
|---|---|---|---|
| 1,796,697 | 3/1931 | White | 83/471.3 |
| 2,365,987 | 12/1944 | Zimmerman | 83/487 X |
| 2,545,549 | 3/1951 | Guill et al. | 83/DIG. 1 |
| 3,361,020 | 1/1968 | Baker | 83/488 X |
| 3,386,322 | 6/1968 | Stone et al. | 83/488 |
| 3,413,881 | 12/1968 | Stolzer | 83/488 X |
| 3,487,863 | 1/1970 | Buckley | 83/581 X |
| 3,623,516 | 11/1971 | Kirk | 83/468 |
| 3,718,061 | 2/1973 | Wilkin | 83/468 X |
| 3,793,727 | 2/1974 | Moore | 83/DIG. 1 X |
| 3,815,456 | 6/1974 | Braathen et al. | 83/DIG. 1 X |

Primary Examiner—J. M. Meister
Assistant Examiner—Fred A. Silverberg
Attorney, Agent, or Firm—Donnelly, Maky, Renner & Otto

[57] ABSTRACT

An undercut saw having a rotating blade mounted beneath a table for selective raising and lowering movement through a table slot by operation of fluid power means. A blade guard and workpiece clamp is mounted above the table for selective movement toward and away from the table by operation of fluid power means. A pair of manually operable series connected control devices operate the fluid power means.

11 Claims, 5 Drawing Figures

U.S. Patent   March 30, 1976   Sheet 3 of 3   3,946,631
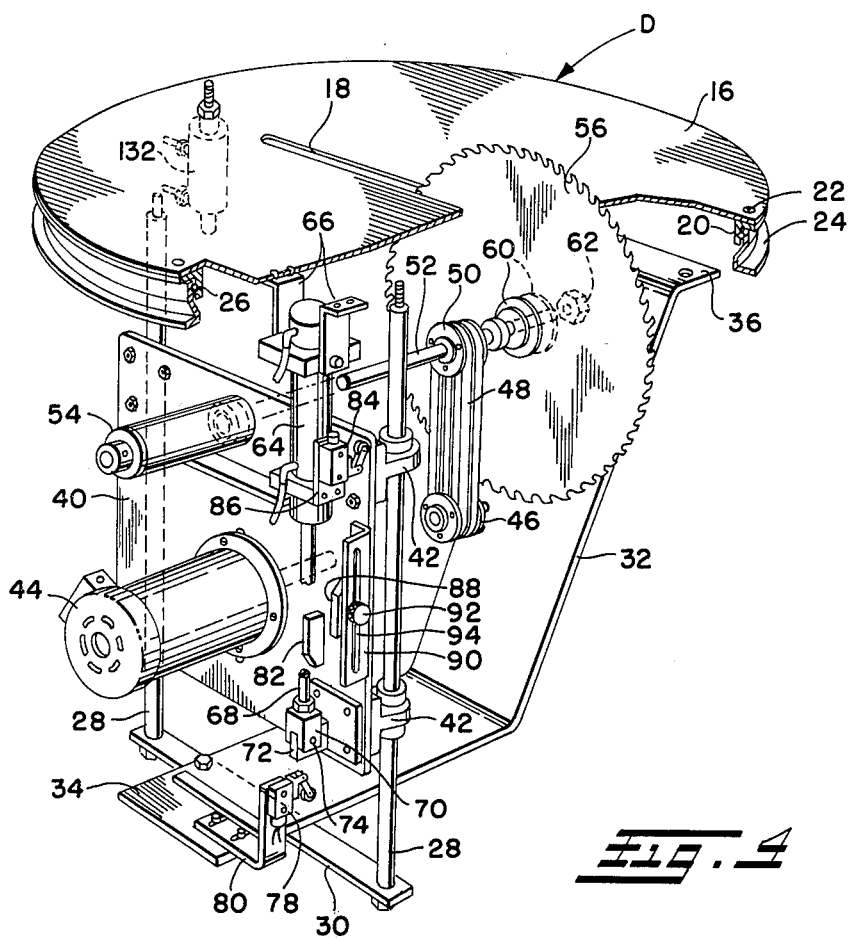
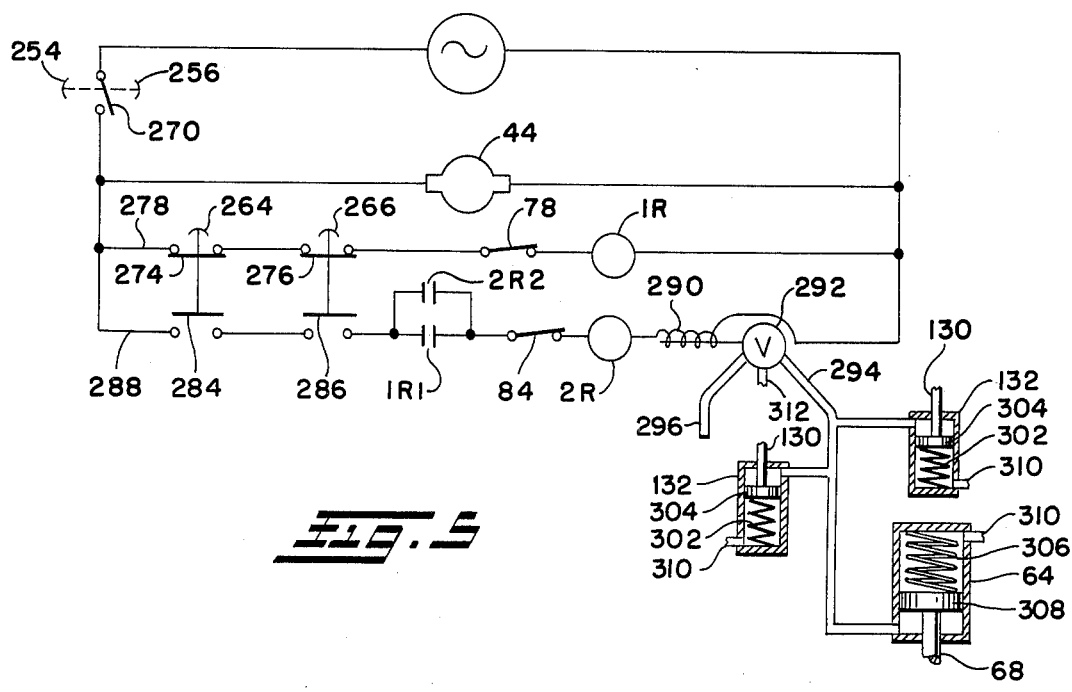

UNDERCUT SAW

BACKGROUND OF THE INVENTION

This application pertains to the art of undercut saws of the type having a rotating blade mounted beneath a table for raising and lowering movement through a table slot for cutting workpieces positioned on the table.

Saws of the type described are commonly used for cutting wood to predetermined lengths with desired predetermined angles at the opposite ends. The end product may, for example, be fabricated roof trusses.

Reference may be had to U.S. Pat. Nos. 3,623,516 to Kirk and 3,487,863 to Buckley for examples of prior art patents in this area. Such cutting of workpieces to various lengths with various end angles requires that the saw be rapidly adjustable. At the same time, it is necessary to provide secure clamps for holding workpieces and adequate safeguards for preventing injury to the person operating the saw. Operation of such a saw without having the workpiece securely clamped or in a manner which enables the operator to place his hands in the area of the workpiece while a clamp and cut are being made can result in serious injury to the operator.

SUMMARY OF THE INVENTION

An undercut saw of the type described includes a pair of series connected manually operable control devices for operating fluid power means to lower a workpiece clamp and raise the blade through the table slot. Such an arrangement prevents the operator of the saw from having a hand in the area of the blade or workpiece while a cut is being made because both hands must be used to operate the control devices.

In accordance with a preferred arrangement, the fluid power means is constructed and connected for ensuring movement of a workpiece clamp to its clamping position prior to raising movement of the blade through the slot.

In accordance with another aspect of the invention, release of the control devices for movement thereof to an inoperative position automatically returns the saw blade toward its lowermost position from any raised position thereof. Limit switches are located at the lowermost and uppermost positions of the saw blade for controlling the fluid power means to automatically move the blade from its lowermost to its uppermost position and then back to its lowermost position when the control devices are continuously maintained in operative positions. The lower limit switch also deenergizes the fluid power means when the blade reaches its lowermost position. This prevents continuous cycling of the blade in its raising and lowering movements without resetting the control devices.

The blade is rotatably mounted on a generally flat carrier plate having bushings on the opposite vertical end portions thereof slidably receiving guide rods depending from the table.

The undercut saw of the present invention includes fluid power locking means selectively engageable with the outer periphery of the rotatable table for locking such table in a desired position. An arcuate protractor is secured to the outer periphery of the table and cooperates with an indicator on the saw support for indicating the angle at which the table slot intersects the longitudinal axis of a workpiece.

The saw of the present application includes infeed and discharge workpiece supports on opposite sides of the saw table for feeding workpieces across such table along a predetermined longitudinal axis extending transversely of the table slot. Selectively operable workpiece clamps are provided on the workpiece supports adjacent the saw table. Such clamps are preferably adjustable for selectively positioning the clamp jaws at varying distances from the table slot. An adjustable workpiece gage stop on the discharge support gages workpiece lengths beyond the table slot. The gage stop is mounted on a trolley selectively movable along the discharge support. The trolley includes measuring indicator means and locking means for indicating the distance of the gage stop from the table slot and for locking the trolley against movement relative to the discharge support.

It is a principal object of the present invention to provide an improved undercut saw having safety features for preventing injury to the saw operator.

Another important object is the provision of an undercut saw supported on the underside of a turntable for vertical linear movement on a vertically oriented plate in turn mounted on and extending between two vertically extending guide rods depending from the turntable.

An additional object is the provision of a movable saw blade carrier plate suspended on guide rods which are transversely braced by a brace connected to their distal ends and extending beneath the blade.

Another object is to suspend a saw blade beneath a table on a flat carrier plate extending parallel to the blade, and havving the blade and blade driving motor positioned on opposite sides thereof.

Another object of the invention is to provide such a saw which is very rapid in operation and quickly adjustable for cutting workpieces to various lengths and with various angles on the opposite workpiece ends.

A further object of the invention is to provide improved workpiece infeed and discharge supports having workpiece clamping and adjustable length gaging devices.

BRIEF DESCRIPTION OF THE DRAWING

FIG. 4 is a cut-away perspective illustration showing how the saw blade is mounted beneath the saw table; and FIG. 5 is a schematic circuit diagram showing a control arrangement.

DESCRIPTION OF A PREFERRED EMBODIMENT

Figure 1:
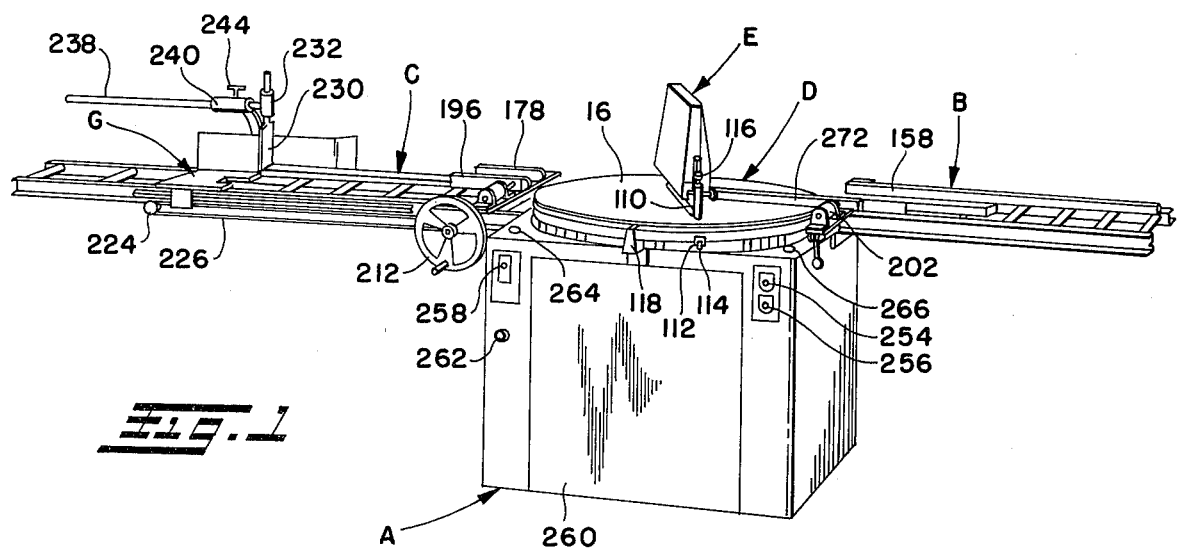
FIG. 1 is a perspective illustration of an undercut saw constructed in accordance with the present invention.

Referring now to the drawings, wherein the showings are for purposes of illustrating a preferred embodiment of the invention and not for purposes of limiting same, FIG. 1 shows a cabinet A defining the main support and enclosure for the various parts of the undercut saw constructed in accordance with the present invention.

Figure 2:
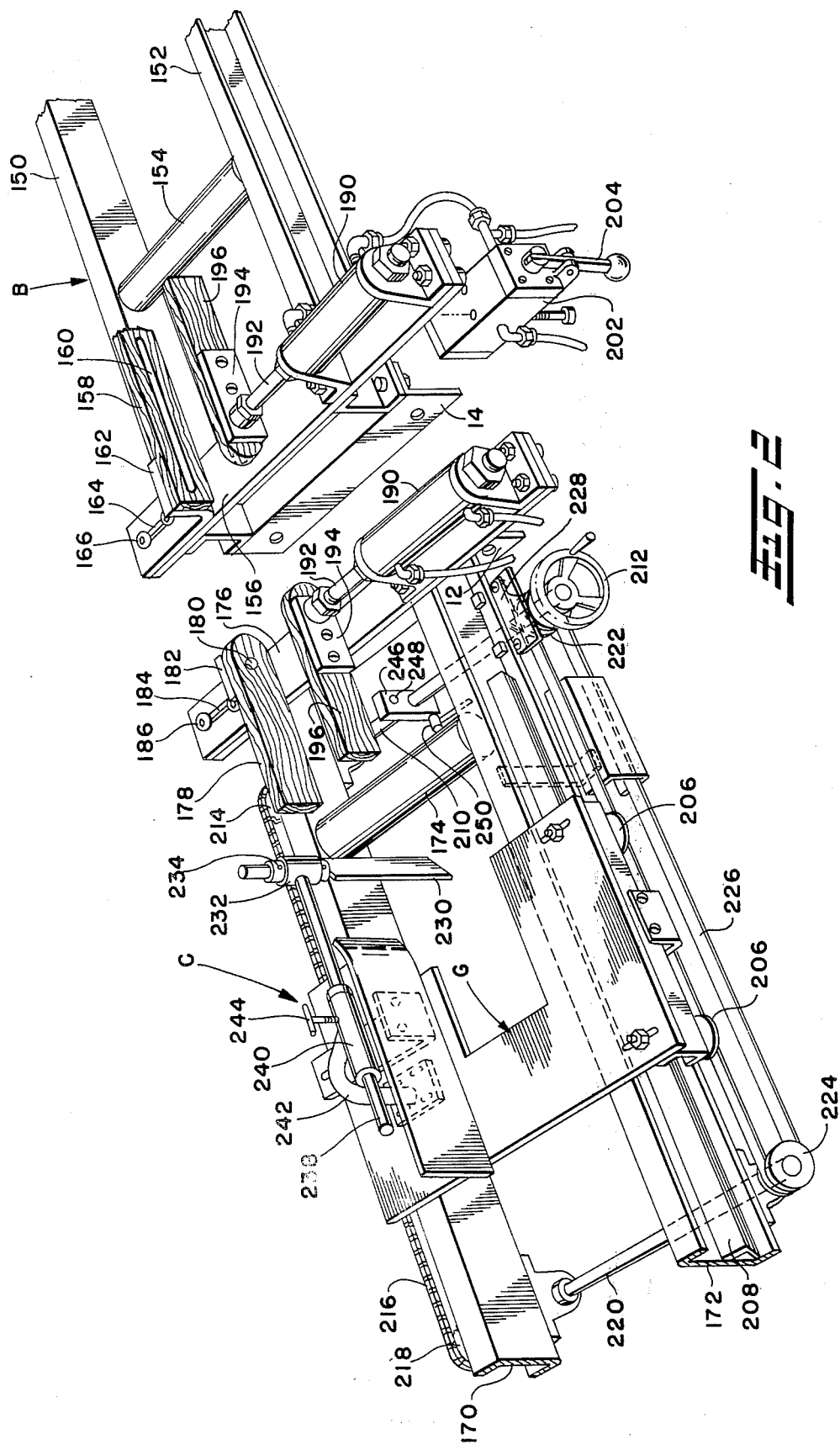
FIG. 2 is a perspective illustration showing workpiece infeed and discharge supports.

Workpiece infeed and discharge support conveyors B and C are suitably attached to cabinet A as by brackets shown at 12 and 14 in FIG. 2 on opposite sides of generally circular work support table D.

As best shown in FIG. 4, table D includes a generally circular flat metal plate 16 having an elongated central slot 18 therein and a circumferential angle member 20 is secured to the lower outer periphery thereof as by set screws 22. A circumferential angle member 24 is suitably bolted to the top of cabinet A around a top central opening therein and has an inwardly facing bearing race cooperating with an outwardly facing bearing race on angle member 20 for receiving ball bearings 26 so that plate 16 and angle member 20 are rotatable about a substantially vertical axis relative to angle member 24 and cabinet A.

Plate 16 has a substantial thickness, such as around ⅝ inch, for withstanding heavy use and so that tapped bores can be formed in its lower surface for reception of threaded rods or bolts to suspend the parts which will be described. A pair of elongated spaced-apart vertical guide rods 28 have upper threaded ends received in suitable tapped holes in the underside of plate 16. The distal ends of guide rods 28 are connected together in spaced-apart relationship by cross brace 30 suitably secured thereto. A transverse brace member 32 has a lower end portion 34 suitably bolted to cross brace 30 and an upper end portion 36 suitably bolted to the underside of plate 16.

A generally rectangular carrier plate 40 has bushings bolted or otherwise secured to the opposite inner vertical portions thereof for slidably receiving guide rods 28. Only two such bushings are shown at 42 in FIG. 4 receiving one of guide rods 28, and it will be recognized that similar bushings on the opposite inner face of carrier plate 40 slidably receive the other guide rod.

An electric motor 44 mounted on one side of carrier plate 40 has its output shaft extending therethrough for driving a pulley 46 around which belts 48 extend into driving engagement with pulleys 50 for rotating shaft 52 rotatably journaled in bearing 54 and on which a circular saw blade 56 is suitably mounted in known manner as by clamping discs 60 and nut 62 threaded onto such shaft.

Pneumatic cylinder 64 has brackets 66 secured thereto and to the underside of plate 16 for suspending such cylinder therefrom. Cylinder rod 68 has a clevis member 70 on its distal end receiving a projection 72 on a bracket fixed to carrier 40 and secured thereto as by pin 74. Selective operation of cylinder 64 to retract or extend rod 68 raises and lowers carrier plate 40 on guide rods 28 to selectively raise and lower blade 56 through table slot 18.

A lower limit switch 78 is mounted on a bracket 80 suitably bolted to lower end portion 34 of transverse brace 32 and cooperates with a cam member 82 suitably bolted to carrier plate 40. An upper limit switch 84 is mounted on a bracket 86 secured to cylinder 64 and cooperates with a cam 88 clamped to carrier 40 in vertically adjusted position against bracket 90 by thumb screw 92 extending through elongated vertical slot 94. The operation of such limit switches 78 and 84 will be described hereafter.

Figure 3:
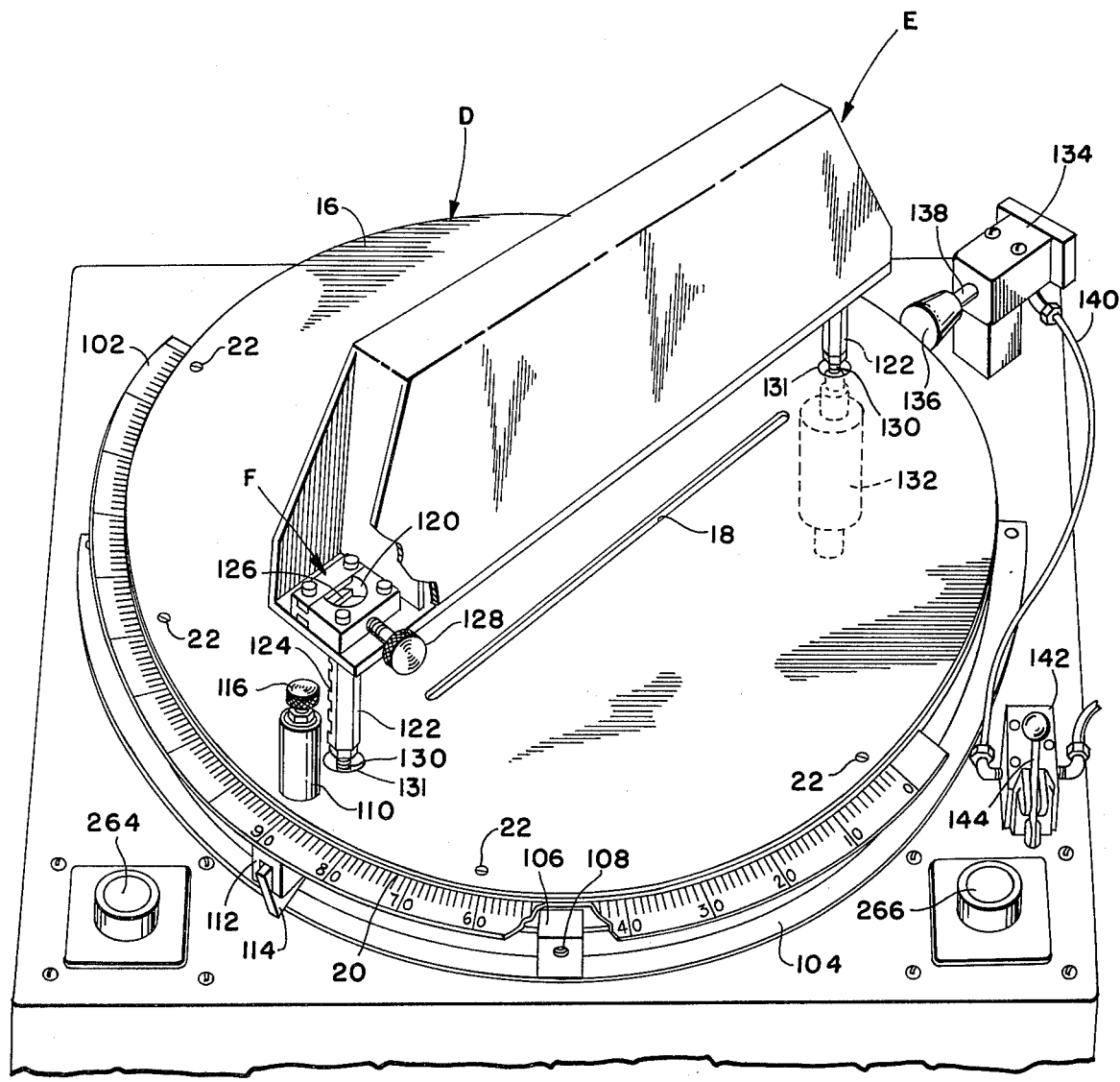
FIG. 3 is a perspective illustration of the top of the undercut saw of the present invention.

As best shown in FIG. 3, an arcuate flat protractor segment 102 has suitable tapped vertical holes in the inner portion thereof for receiving screws 22 for clamping such segment against the downwardly facing surface of the outwardly extending leg on angle member 20, and with such segment being out of contact with supporting angle member 24. This arrangement makes protractor segment 102 easily replaceable simply by loosening those screws 22 which extend therethrough.

An arcuate angle member 104 is secured to the top of cabinet A outwardly of supporting angle member 24. Abutment blocks, only one of which is shown at 106 in FIG. 3, have transverse slots slidably receiving the upstanding leg of angle member 104 for sliding adjustment of such block relative to such angle member. A tapped hole extends through such block and intersects the slots therein for receiving a set screw 108 to clamp such block against angle member 104 in a desirable adjusted position. It will be recognized that a plurality of such blocks 106 are provided for adjustable clamping to angle member 104.

A handle sleeve member 110 has a reduced diameter threaded lower end portion extending through holes in plate 16 and angle member 20 outwardly of supporting angle member 24 and threaded into a tapped hole in the web of an inverted U-shaped stop bracket 112 positioned beneath protractor segment 102. This securely clamps handle sleeve 110 to the upper surface of plate 16 and stop bracket 112 against the underside of protractor segment 102.

Stop bracket 112 has a stop plate 114 pivotally connected thereto for pivotal movement about a horizontal axis, the outer end of such plate being heavier beyond the pivot than the inner end thereof so that its outer end is normally in the lowered position shown under the force of gravity. A spring within sleeve handle 110 normally biases thumb knob 116 and its rod vertically upward. A person may grasp sleeve handle 110 and depress thumb knob 116 with his thumb so that the rod will engage the upper rear edge of stop plate 114 to pivot the outer end thereof upwardly for movement thereof past abutment blocks 106. Releasing the downward force on thumb knob 116 automatically causes the outer end of stop plate 114 to pivot downwardly for engagement with a next abutment block 106.

An indicating pointer 118 in FIG. 1 is bolted to cabinet A and extends above protractor segment 102 for indicating the rotated position of table D. The indicia on protractor segment 102 are located in relation to indicating pointer 118 so that a reading of 90° will be obtained when table D is in a position with table slot 18 extending perpendicular to the longitudinal axis along which workpieces are fed across table D from infeed support conveyor B to discharge support conveyor C. The different angular cuts which will be made can be set up by rotating table D until the proper angle is indicated between the indicating pointer and protractor segment. Abutment blocks 106 are then adjusted into engagement with stop plate 114 so that the various angles of the end cuts can subsequently be located automatically.

A combined workpiece clamp and saw blade guard E positioned above table D has a generally hollow rectangular shape with a downwardly facing opening completely longitudinally and transversely spanning slot 18. Height adjusting devices F at the opposite ends of clamp E include vertical holes 120 for receiving upstanding posts 122 having vertically-spaced horizontal slots 124 therein. A slot engaging plate 126 in hole 122 is drawable into any one of slots 124 by operation of thumb screw 128 which bears on posts 122 opposite from slots 124. Posts 122 are threaded onto rods 130 of pneumatic cylinders 132 suitably bolted by brackets to the underside of plate 16, with such rods extending through suitable holes 131 in plate 16. Selective operation of cylinders 132 selectively raises and lowers clamp E for movement toward and away from table D.

Adjustment devices F minimize the necessary stroke of cylinders 132 in accordance with the thickness of workpieces being cut. The bottom edge of clamp E securely clamps workpieces onto table D.

In the preferred arrangement, clamping cylinders 132 are constructed and connected in relationship to blade raising and lowering cylinder 64 in such a manner that cylinders 132 are more rapidly acting to insure movement of clamp E to a workpiece clamping position prior to movement of blade 56 upwardly through table slot 18 for cutting a workpiece. It will be recognized that it is also possible to position a limit switch on the underside of clamp E for contact with a workpiece to insure that such clamp is in proper position prior to operation of blade raising cylinder 64.

A table locking pneumatic cylinder 134 is mounted to the top of cabinet A and has a locking head 136 on its rod 138 for engagement with the outer periphery of table D. Cylinder 134 is of the type wherein rod 138 is normally held in retracted position by a spring. Pneumatic pressure supplied through line 140 on one side of the cylinder piston extends rod 138 against the force of the spring so that locking head 136 firmly engages the outer periphery of table D for locking such table against rotation during a cutting operation. Pneumatic line 140 is connected to a suitable source of pneumatic pressure through a valve 142 having an operating handle 144. Pushing of such handle 144 will open valve 142 for supplying pressure to cylinder 134, while pulling movement of handle 144 will move valve 142 to a position blocking flow of pressure therethrough and exhausting line 140.

It will be recognized that the distal ends of workpiece support conveyors B and C are suitably supported by upright legs. Workpiece infeed support conveyor includes spaced-apart parallel channel members 150 and 152 between which rollers 154 are positioned for supporting elongated workpieces for movement toward table D. A support plate 156 spans the inner ends of rails 150 and 152, and has its upper surface lying in a substantially common plane with the upper surface of plate 16 on table D. A clamp jaw 158 has an elongated countersunk slot 160 therein for receiving bolts to secure jaw 158 to bracket 162 having an elongated slot 164 receiving screws 166 threaded into tapped holes in plate 156. At least one other bracket 162 is provided for jaw 158. Loosening of screws 166 or positioning such screws in different tapped holes in plate 156 allows adjustment of jaw 158. Loosening of the bolts extending through countersunk slot 160 also allows adjustment of jaw 158 toward and away from slot 18 in table D.

Workpiece discharge support conveyor C also includes spaced-apart parallel channels 170 and 172 having rollers 174 extending therebetween for movement of workpieces thereover. Support plate 176 spanning the inner ends of channels 170 and 172 has its upper surface lying in substantially the same plane as the upper surface of plate 16 on table D. Clamp jaw 178 has a countersunk hole 180 therein for receiving a bolt which secures jaw 178 to bracket 182 having an elongated slot 184 through which screws 186 extend into holes in plate 176. This allows limited adjustment of jaw 178 in the same manner as the adjustment of jaw 158. Jaw 178 is also pivotable about its connection to bracket 182 so that it can extend either away from slot 18 in the position shown in FIG. 2 or can overlie table D and extend toward slot 18. Clamp jaw 158 could also be a pivoted-type like jaw 178 if so desired.

Pneumatic clamp cylinders 190 are suitably mounted on plates 156 and 176, and have rods 192 on which brackets 194 are secured. Movable clamp jaws 196 are constructed the same as jaw 178 and have countersunk holes which are not shown for receiving bolts to secure such jaws to brackets 194. Jaws 196 and brackets 194 are also pivotable about the axes of rods 192 so they can extend either toward or away from slot 18 in table D. Movable jaws 196 move toward and away from fixed jaws 158 and 178 in directions substantially perpendicular to the longitudinal axis along which workpieces move across table D. Cylinders 190 are of a type wherein rods 192 are spring biased to a retracted position and are extended for clamping purposes under the force of pneumatic pressure. A suitable control valve 202 having an operating handle 204 is connected to a source of pneumatic pressure and to cylinders 190. Movement of valve handle 204 operates valve 202 to either open the air lines leading from valve 202 to cylinders 190 to the source of pneumatic pressure or to close off communication of the source of pressure with cylinders 190 and to vent the cylinder chambers.

A trolley G spans channels 170 and 172, and has rollers 206 mounted thereon for rotation about vertical axes riding on rails 208 welded or otherwise secured to the outer faces of channels 170 and 172. Shaft 210 extends through suitable bearing blocks attached to channels 170 and 172 and has an operating wheel 212 attached to one end thereof. The opposite end of shaft 210 has a sprocket 214 secured thereto around which a chain 216 extends. Chain 216 extends around an idler sprocket 218 attached to shaft 220 rotatably mounted in suitable bearing blocks attached to channels 170 and 172. The upper extent of chain 218 is suitably secured to trolley G so that rotation of sprocket 214 causes linear movement of the upper reach of chain 216 for shifting trolley G longitudinally along discharge support C. Shafts 210 and 220 have pulleys 222 and 224 secured thereto around which a continuous measuring tape 226 having indicia thereon extends. The upper reach of tape 226 is also suitably secured to trolley G. Linear movement of the upper reach of tape 226 aligns the indicia thereon with an indicating pointer 228 adjacent wheel 212 for indicating the distance of workpiece gage stop 230 from slot 18. Gage stop 230 comprises a flat plate having a rod at the upper end thereof extending through a sleeve 232 and selectively fixable against rotation relative thereto by set screws 234. Sleeve 232 has a rod 238 attached thereto and extending through sleeve 240 on arm 242 extending upwardly from trolley G. A T-bolt 244 is threaded in a tapped hole in sleeve 244 for engagement with rod 238 for locking rod 238 in an axially adjusted position relative to sleeve 240. Rotational adjustment of gage stop 230 and longitudinal adjustment of rod 238 relative to trolley G makes it possible to correlate the indication between tape 226 and indicator 228 with the centerline length of a workpiece regardless of the end cut angle on the opposite ends of the workpiece.

A split block 246 is received on shaft 210 and defines a locking device having hole 248 therein for receiving a bolt which threads into a suitable tapped hole in rail 172. Locking device 246 includes a locking bolt 250 for drawing the split portions closer together for locking or clamping engagement with shaft 210 to prevent rotation thereof for holding trolley G in its desired adjusted position. Loosening of locking bolt 250 allows rotation of shaft 210 by operation of handwheel 212 for moving trolley G and gage stop 230 to a different adjusted position.

As shown in FIGS. 1 and 3, cabinet A has start and stop buttons 254 and 256 mounted thereon for energizing the saw. A key-operated switch 258 may also be provided to prevent unauthorized operation of the saw. A hinged front panel 260 on cabinet A closeable by a key-operated lock 262 is provided for gaining access to the parts mounted within cabinet A. A pair of widely spaced-apart pushbutton switches 264 and 266 are mounted on the top of cabinet A for controlling raising and lowering movement of the saw blade. Switches 264 and 266 define series connected manually operable control devices which require the operator to use both hands for operating the saw.

As shown in FIG. 5, start-stop switch 270 is controlled by start and stop pushbuttons 254 and 256 for selectively starting and stopping operation of the saw. Closing of switch 270 by operation of the start pushbutton energizes motor 44 which rotates saw blade 56. An elongated workpiece shown at 272 in FIG. 1 comprises a wooden beam or the like. Trolley G will have been adjusted along with workpiece gage stop 230, and table D will have been rotated to the desired position for cutting a predetermined angle on the end of workpiece 272. With workpiece 272 properly positioned on table D, and with valve 142 opened for extending locking head 136 into engagement with table D, valve 202 is operated for extending the movable jaws attached to the rods on clamp cylinders 190. Manually operated control devices 264 and 266 are depressed for raising saw blade 56 through slot 18.

Control devices 264 and 266 are shown in their normal inoperative positions in FIG. 5 wherein contact blades 274 and 276 are closed for completing a circuit in line 278, while blades 284 and 286 are open so that line 288 is open-circuited. When switch 270 is closed, a circuit is completed through pushbuttons 264 and 266 in line 278, and through normally closed lower limit switch 78 and relay 1R. Energization of relay 1R closes its normally open contact 1R1 in line 288. Simultaneous depression of pushbuttons 264 and 266 will allow blades 284 and 286 to complete a circuit through line 288. The circuit is completed through closed contact 1R1 to normally closed upper limit switch 84 and relay 2R having a normally open contact 2R2 in parallel with contact 1R1. Solenoid 290 is also energized for opening valve 292 which is connected through conduit 294 leading to clamp cylinders 132 and blade moving cylinder 64.

Conduit 296 connects valve 292 with a suitable source of pneumatic pressure. As illustrated diagrammatically in FIG. 5, springs 302 within clamp cylinders 132 act upon pistons 304 connected with rods 130 for extending such rod and raising workpiece clamp E to an elevated position. Spring 306 within cylinder 64 acts on piston 308 attached to rod 68 for normally extending such rod. All such cylinders are vented as at 310 on the spring ends thereof. The volume of cylinders 132 is much smaller than cylinder 64 so that cylinders 132 are much more rapidly acting than cylinder 64. When valve 292 is opened, fluid pressure entering cylinders 132 retracts rods 130 for moving clamp E downwardly toward table D for securely clamping a workpiece thereagainst. Subsequently, pressure within cylinder 64 builds up sufficiently for retracting rod 68 to raise carrier 40 and raise blade 56 upwardly through slot 18 for cutting the workpiece. If pushbuttons 264 and 266 are continuously maintained depressed, limit switch 84 is opened by cam 88 upon blade 56 reaching its uppermost position to open circuit line 288. This de-energizes solenoid 290 for closing valve 292 which cuts off the supply of pressure from conduit 296 and vents conduit 294 to atmosphere through vent 312. The springs in the cylinders will then move carrier 40 back toward its lowermost position and will also release clamp cylinders 132. One-way restrictions in the inlets from conduit 294 to clamp cylinders 132 may be provided so that the pressure within blade moving cylinder 64 will be released more rapidly than clamp cylinders 132. This will maintain clamp E in firm engagement with the workpiece until blade 56 is lowered through slot 18. If pushbuttons 264 and 266 are held depressed after limit switch 84 momentarily opens and carrier 40 begins moving down, there will be no complete circuit in line 288 because relays 1R and 2R are both de-energized, and contacts 1R1 and 2R2 are open. Upon carrier 40 reaching its lowermost position, limit switch 78 will again close. However, carrier 40 will not again move upwardly with buttons 264 and 266 maintained depressed because such buttons must be released for resetting the circuit by completing a circuit in line 278 through relay 1R1. Limit switch 78 is open in any raised position of carrier 40 above its lowermost position. Therefore, if pushbuttons 264 and 266 are released at any raised position of carrier 40, the circuit in line 288 is opened for closing valve 292 and automatically lowering blade 56 back toward its lowermost position. Carrier 40 cannot again be raised until it has reached its lowermost position closing limit switch 70 to reset the circuit.

Although the various cylinders have been described as being single-acting and pneumatic, it is obvious that such cylinders could also be double-acting and could also be hydraulic. Such cylinders define the fluid power means for raising and lowering the saw blade, and operating the clamps. Such fluid power means are controlled by the series-connected manually operable control devices. Release of the manually operated control devices for movement thereof to inoperative positions automatically lowers the blade through the table slot from any raised position thereof. Constructing and connecting the clamp cylinders to insure engagement of the workpiece clamp prior to raising movement of the saw blade provides very safe operation. Restricting relief of such clamp cylinders also insures that the workpiece clamp and blade guard will remain in position until the blade has been lowered out of contact with the work. It is also possible to connect carrier cylinder 64 for operation by a separate valve and solenoid connected in parallel with valve 292 and solenoid 290, and to connect a limit switch in series with such separate valve and solenoid. This additional limit switch would be attached to clamp E for engagement with workpieces on table D so that carrier cylinder 64 would not operate until the limit switch sensed the clamped position of clamp E. It is also possible to connect a normally open switch in line 288 of FIG. 5 for operation by handle 144 of locking cylinder valve 142 in order to prevent raising movement of the blade unless handle 144 is thrown to a position for engaging locking head 136 of cylinder 134 with the periphery of table D.

Although the invention has been shown and described with respect to a preferred embodiment, it is obvious that equivalent alterations and modifications will occur to others skilled in the art upon reading and understanding of this specification. The present invention includes all such equivalent alterations and modifications, and is limited only by the scope of the claims.

I claim:

1. An undercut saw including a rotatable work support table having an elongated slot therein, a rotatable saw blade operatively mounted beneath said table selectively to be raised and lowered through said slot, a saw blade guard and workpiece clamp spanning said slot above said table, said guard and clamp being movable toward and away from said table, respective fluid power means for said guard and clamp and said saw blade sequentially operative to move said guard and clamp downwardly into engagement with a workpiece on said table and then to move said saw upwardly through said slot, two laterally spaced control devices, one at each side of said table, adapted when simultaneously manually actuated to operate said respective fluid power means, means sequentially operative to lower said saw and then to raise said clamp when the workpiece is cut or when the control devices are prematurely deactuated prior to finishing the cut, a pivotal stop plate carried by said rotatable table, said stop plate nomally being positioned to engage selectively circumferentially spaced fixed abutment blocks to provide index stops for said rotatable table, and an actuator carried by said table operative when depressed to pivot the stop plate to a position permitting the table to be rotated past an abutment block without engagement.

2. The undercut saw of claim 1, further including two downwardly depending guide rods mounted to the underside of said table, a carrier connected between said rods for reciprocal vertical movement therealong, said saw blade being mounted in cantilevered relationship to said carrier and being raised and lowered through the slot in said table by the reciprocal vertical movement of the carrier.

3. The undercut saw of claim 1 wherein said actuator comprises a spring-loaded thumb knob extending from the upper end of a handle mounted on the top of said table.

4. The undercut saw of claim 2 wherein said saw fluid power means interconnects said table and said carrier vertically to reciprocate said carrier on said rods.

5. The undercut saw of claim 2 wherein said carrier comprises a substantially flat plate having two vertically spaced bushings adjacent one edge slidably to receive one of said rods and at least one bushing adjacent the other edge slidably to receive the other rod.

6. The undercut saw of claim 2 further including a cross member to connect the lower ends of said guide rods and a brace connected to said cross member and extending beneath said blade and upwardly to connection with said table on the opposite side of said blade from said carrier.

7. An undercut saw comprising a turntable rotatable about a vertical axis and having a slot therein, a pair of parallel guide rods secured at their upper ends to the underside of said turntable, a vertically extending plate mounted on said guide rods for vertical movement therealong, a saw drive motor mounted on one side of said plate with its drive shaft extending through said plate, a saw driven by said motor and mounted on the other side of said plate to move through said slot when said plate is elevated, a blade guard and workpiece clamp positioned above said turntable over said slot, posts at the ends of said clamp extending downwardly through said table, fluid power means beneath said table vertically to move said clamp, and means selectively adjustably to connect said clamp to said posts to very the vertical spacing between said clamp and table for different workpiece thicknesses.

8. An undercut saw as set forth in claim 7 including a saw shaft parallel to said drive shaft journalled on said one side of said plate and projecting through said plate to extend in cantilever fashion on the opposite side, and drive means interconnecting said drive shaft and said saw shaft on aid opposite side of said plate.

9. An undercut saw as set forth in claim 7 wherein said rods are interconnected at their lower ends to ensure their parallelism, and brace means interconnecting the lower ends of said rods and the underside of said turntable.

10. An undercut saw as set forth in claim 7 wherein said plate is moved vertically by a vertically oriented pistoncylinder assembly interconnecting said turntable and said plate.

11. the undercut saw of claim 7 wherein said plate includes two vertically spaced bushings on one edge to receive one of said rods and at least one bushing on the other edge to receive the other rod.

* * * * *